US008505981B2

(12) United States Patent
Jacklich et al.

(10) Patent No.: US 8,505,981 B2
(45) Date of Patent: Aug. 13, 2013

(54) GASKET-LESS VENT PIPE COUPLING

(75) Inventors: John R. Jacklich, Napa, CA (US); Eric Adair, Dixon, CA (US)

(73) Assignee: M&G DuraVent, Inc., Vacaville, CA (US)

( * ) Notice: Subject to any disclaimer, the term of this patent is extended or adjusted under 35 U.S.C. 154(b) by 87 days.

(21) Appl. No.: 11/743,041

(22) Filed: May 1, 2007

(65) Prior Publication Data

US 2007/0256682 A1 Nov. 8, 2007

Related U.S. Application Data

(60) Provisional application No. 60/797,191, filed on May 2, 2006.

(51) Int. Cl.
*F16L 17/00* (2006.01)
(52) U.S. Cl.
USPC ........... 285/123.15; 285/123.1; 285/124.2; 285/347; 285/401
(58) Field of Classification Search
USPC .......... 285/123.1, 123.3, 123.5, 123.15, 285/123.16, 124.1, 124.2, 133.3, 396, 401–402, 285/924, 903, 133.6, 361, 399, 347
See application file for complete search history.

(56) References Cited

U.S. PATENT DOCUMENTS

| | | | | |
|---|---|---|---|---|
| 63,797 A | * | 4/1867 | Hurd | 285/402 |
| 177,729 A | | 5/1876 | Loring | |
| 211,164 A | * | 1/1879 | Klein | 285/401 |
| 266,017 A | * | 10/1882 | Cooper | 285/402 |
| 554,666 A | | 2/1896 | Feltner | |
| 641,846 A | | 1/1900 | Davenport et al. | |
| 796,084 A | | 8/1905 | Orr | |
| 1,279,935 A | | 9/1918 | Sweat | |
| 1,476,727 A | * | 12/1923 | Quigg | 166/125 |
| 2,650,112 A | * | 8/1953 | Kinkead | 285/47 |
| 2,850,264 A | * | 9/1958 | Grable | 285/123.1 |
| 2,851,288 A | * | 9/1958 | Kinkead | 285/123.16 |
| 2,936,184 A | * | 5/1960 | Epstein | 285/81 |
| 3,226,135 A | * | 12/1965 | Epstein | 285/41 |
| 3,233,927 A | * | 2/1966 | Dewhirst | 285/401 |
| 3,272,537 A | * | 9/1966 | Bellatorre et al. | 285/187 |
| 3,455,580 A | | 7/1969 | Howard | |
| 3,842,721 A | | 10/1974 | Cardiff | |

(Continued)

FOREIGN PATENT DOCUMENTS

JP 52062724 A 5/1977

OTHER PUBLICATIONS

Office Action dated Jun. 18, 2010, U.S. Appl. No. 11/743,290, filed May 2, 2007.

(Continued)

*Primary Examiner* — Aaron Dunwoody
*Assistant Examiner* — Fannie Kee
(74) *Attorney, Agent, or Firm* — Vierra Magen Marcus LLP

(57) ABSTRACT

A coupling feature for double-walled pipes. A double-walled vent pipe section has an outer wall with corresponding male and female coupling features formed on opposite ends thereof. The inner wall of the double-walled pipe section has a small ridge formed around the circumference of one end. When pipe sections are coupled together, the male and female coupling features on the outer walls engage, and the ridge on the inner wall of one pipe section engages with the bare inner wall of the other pipe section.

10 Claims, 3 Drawing Sheets

(56) References Cited

U.S. PATENT DOCUMENTS

| | | | | |
|---|---|---|---|---|
| 3,872,780 | A | * | 3/1975 | Zanias ............................ 454/47 |
| 4,010,728 | A | * | 3/1977 | Hempel et al. ................ 126/509 |
| 4,140,422 | A | | 2/1979 | Crumpler |
| 4,305,180 | A | | 12/1981 | Schwartz |
| 4,502,370 | A | * | 3/1985 | Baileys et al. .................. 454/47 |
| 4,607,665 | A | * | 8/1986 | Williams ...................... 138/148 |
| 4,611,662 | A | | 9/1986 | Harrington |
| 4,929,000 | A | * | 5/1990 | Annestedt, Sr. ......... 285/123.16 |
| 5,466,020 | A | | 11/1995 | Page |
| 5,651,732 | A | * | 7/1997 | Dufour ........................... 454/47 |
| 5,741,084 | A | | 4/1998 | Del Rio |
| 6,062,608 | A | * | 5/2000 | Gerth ....................... 285/123.15 |
| 6,382,680 | B1 | | 5/2002 | Horimoto |
| 6,682,102 | B1 | * | 1/2004 | Betz ......................... 285/123.15 |
| 6,811,190 | B1 | | 11/2004 | Ray |
| 2005/0023825 | A1 | | 2/2005 | Nakamura et al. |

OTHER PUBLICATIONS

Office Action dated Jun. 6, 2011, U.S. Appl. No. 11/743,290 filed May 2, 2007.

English Abstract of Japanese Publication No. JP52062724 published May 24, 1977.

Amendment dated Dec. 8, 2010, U.S. Appl. No. 11/743,290, filed May 2, 2007.

Response to Office Action dated Mar. 25, 2011, U.S. Appl. No. 11/743,290, filed May 2, 2007.

Response to Office Action dated Dec. 6, 2011, U.S. Appl. No. 11/743,290, filed May 2, 2007.

Office Action dated Feb. 22, 2013, U.S. Appl. No. 11/743,290, filed May 2, 2007.

\* cited by examiner

GASKET-LESS VENT PIPE COUPLING

CLAIM OF PRIORITY

This application claims the benefit of U.S. Provisional Application No. 60/797,191 entitled Gasket-Less Pellet Chimney Pipe And Exhaust System Interlocking Mechanism, filed on May 2, 2006, by inventors Jacklich et al., which is incorporated herein by reference

BACKGROUND

The present disclosure is directed to pipe couplings, particularly vent pipes.

Fuel-burning appliances require an exhaust system in order to vent combustion by-products, including noxious gases, fine ash, and water vapor, to the exterior of a building containing the appliance. Such appliances can include, for example, furnaces, water heaters, boilers, room heaters, wood stoves, and pellet stoves. Single-wall and double-wall vent pipes have been developed in numerous types and sizes to meet the need for effective exhaust piping.

Exhaust systems generally include one or more sections of vent pipe, fittings and adapters, made from a ductile material, such as sheet metal. These components are assembled during installation and fit to the given space. Since vent pipes are usually located between walls, in attics, and in crawl spaces, where there is little room to work, the manipulation of the vent pipes and related fittings is difficult, particularly when connecting sections of vent pipe. The connection between adjoining sections of vent pipe must be secure to avoid venting combustion by-products into the living space.

It is typical to form male and female couplings on opposite ends of each vent pipe section to facilitate field connection of the sections. Numerous designs for bayonet or twist-type couplings exist, as illustrated in U.S. Pat. No. 6,811,190, for example. One commercial product using a twist-type coupling is the Type B Gas Vent family of products manufactured by Simpson Dura-Vent Company, Inc.

However, it remains desirable to obtain improved couplings for joining vent pipe sections of various types in order to provide a connection that is secure and easy to assemble in the field.

SUMMARY

The present disclosure describes a coupling feature formed on the inner wall of a double-walled vent pipe. A double-walled vent pipe typically includes corresponding male and female coupling features on opposite ends of the outer wall that allow two pipe sections to be joined in the field. By forming a ridge of adequate dimensions on one end of the inner pipe, the inner pipes may be joined and sealed at the same time. For example, the ridge may be formed around the circumference of the inner wall near one end thereof to have a length and a depth.

In one embodiment, a first pipe section is mated with a second pipe section. Each pipe section includes an outer wall, an inner wall coaxially disposed within the outer wall, and an annular region between the outer wall and the inner wall. The outer wall includes a male coupling feature on one end and a female coupling feature on the other end, and the coupling features are adapted to mate with each other. The inner wall includes a small ridge extending into the annular region near the outer wall female end. When the pipe sections are coupled together, the male coupling feature of the first pipe section engages with the female coupling feature of the second pipe section, and the ridge on the inner wall of the second pipe section engages with the bare inner wall of the first pipe section.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The present disclosure describes a coupling feature included on the inner wall of a double-walled vent pipe. The use of the coupling feature avoids the need for a gasket and/or silicone to seal the coupling. Typically, a double-walled vent pipe includes corresponding male and female coupling features on opposite ends of the outer wall that allow two pipe sections to be quickly and easily coupled in field installations. In accordance with the present disclosure, a ridge or slight protrusion is formed on one end (male end) of the inner pipe and not on the other end (female end). When a first pipe section is coupled to a second pipe section, the ridge on the male end of the first inner pipe presses into the female end of the second inner pipe. In combination with the use of a laser-welded seam on the inner pipes, this type of coupling avoids the need for a sealing gasket and/or silicone while still maintaining adherence to applicable standards for vent pipe performance.

Figure 1:
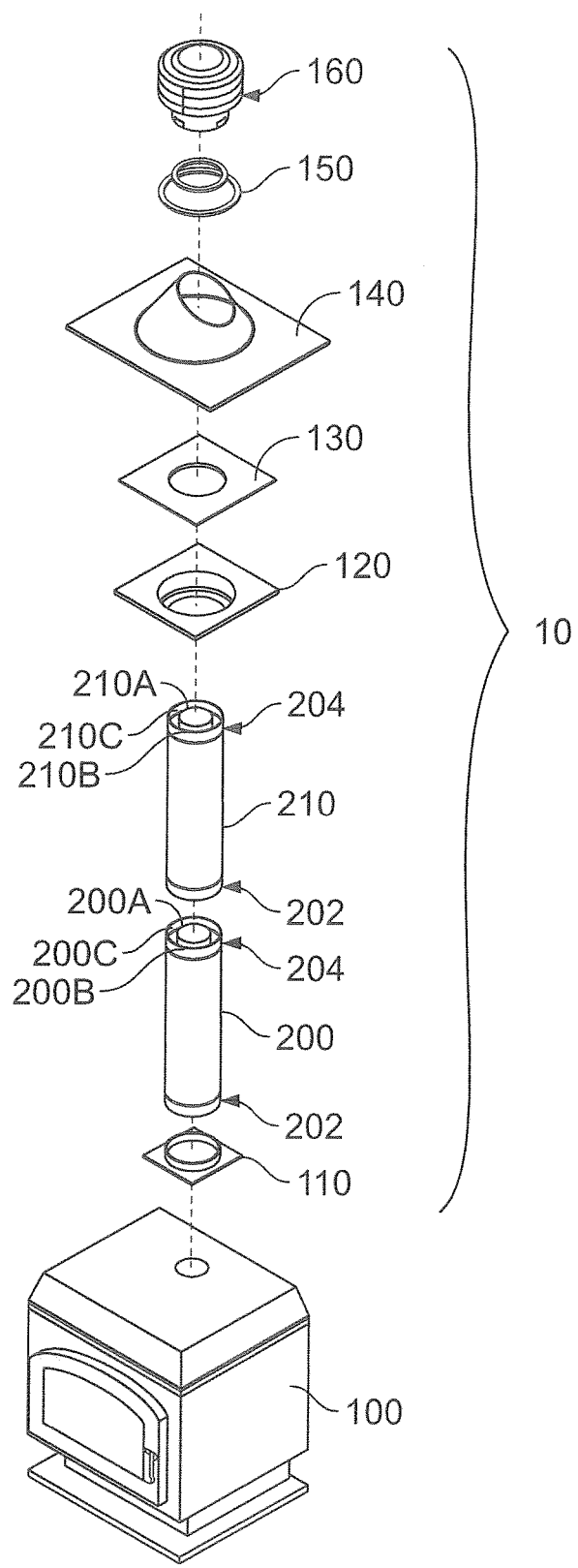
FIG. 1 is an exploded perspective view of an exhaust system coupled to a pellet stove.

Referring now to FIG. 1, an exploded perspective view shows an exhaust system 10 coupled to a heating appliance 100, such as a pellet stove. The exhaust system 10 includes a first pipe section 200, a second pipe section 210, a storm collar 150, and a vertical termination 160. An appliance adapter 110 is often required to couple the first pipe section 200 to the stove 100. Pipe sections 200 and 210 are useful to extend the exhaust system through the roof 120 of a structure containing the heating appliance, and possibly through other structural elements, for example, a ceiling fire stop 130, and flashing 140.

Proper venting is critical to stove performance, and local building codes and manufacturers' installation instructions typically require that a vent pipe be specifically tested, approved, and listed by Underwriters Laboratories ("UL") for use with the appliance. For example, type PL vent pipe, tested to UL 641, is listed as approved for use with pellet stoves, and is commonly available in 3 inch and 4 inch diameter pipe. Type PL vent pipe is a double-walled cylindrical pipe, wherein a stainless steel inner pipe provides a passageway for the exhaust products, and an outer wall is separated from the inner wall by an air space. For stoves that require type PL vent pipe, substitute venting materials should not be used unless such materials are approved by the manufacturer and/or local building codes.

Typically, the components of exhaust system 10 described herein may be fabricated using standard sheet metal materials with conventional bending and fastening techniques. In one embodiment, pipes 200 and 210 are double-walled type PL vent pipes, wherein the respective inner flues 200A, 210A are formed using 0.012 inch type 430 stainless steel, and the respective outer walls 200B, 210B are formed using 0.018 inch galvalume steel to provide heat and corrosion resistance. Annular air spaces 200C, 210C having a depth of approximately one-quarter inch are provided between the inner and outer walls to provide for static air insulation and to ensure safe outer wall temperatures, while also providing a minimum clearance to nearby combustibles. In a conventional pipe coupling, each pipe joint typically contains a high temperature ceramic rope gasket, and all elbows, tees, and fittings are sealed with a liberal amount of room-temperature-vulcanizing ("RTV") silicone to prevent fly ash leakage. However, in accordance with the present disclosure, the joint between the inner walls of pipe sections 200 and 210 is not sealed in a conventional manner, but instead, a raised seam is formed in the annular region on at least one of the inner walls, and the raised seam creates an effective seal when pipe sections 200 and 210 are coupled together.

Figure 2:
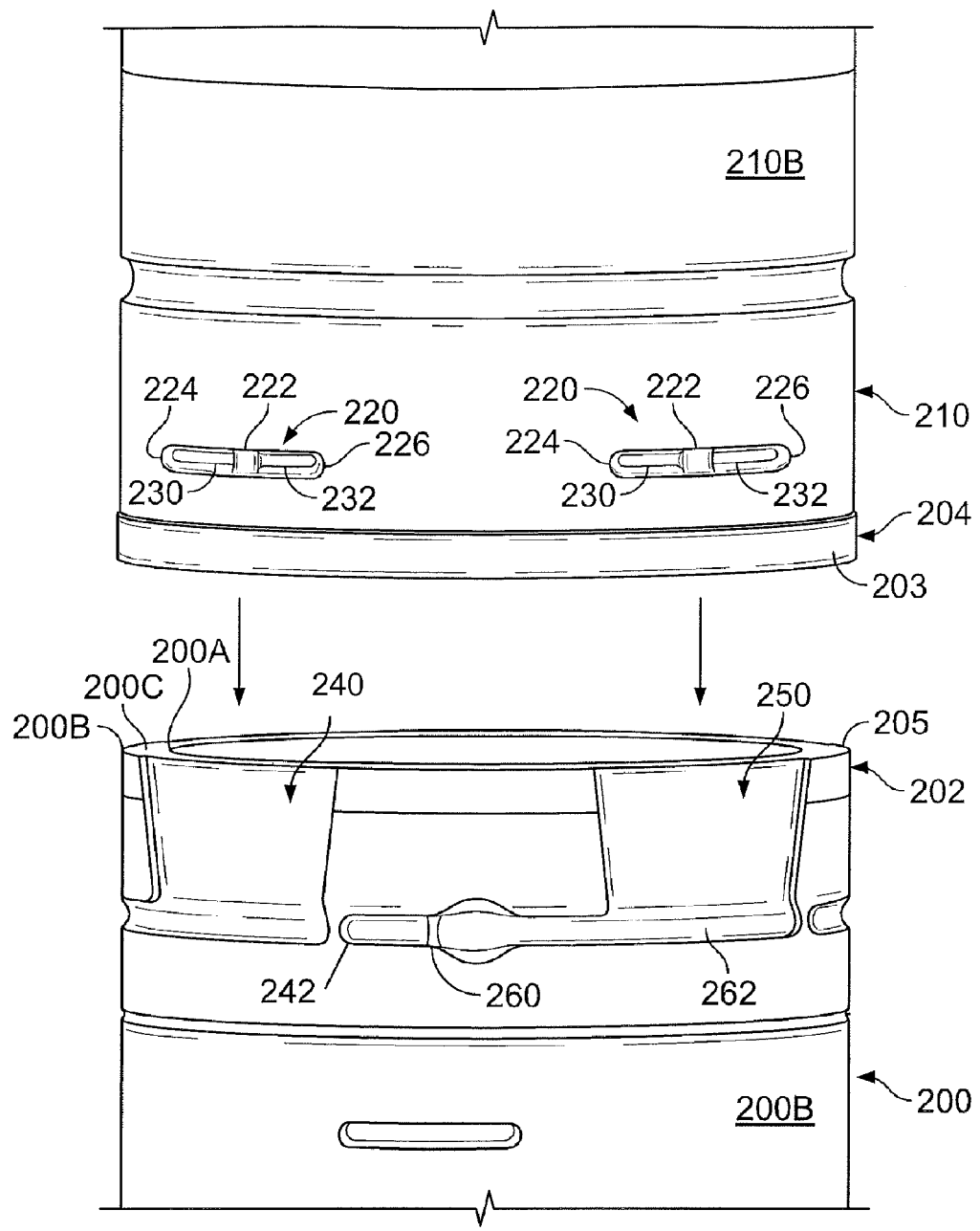
FIG. 2 is a side plan view illustrating a coupling of the outer walls of two double-walled vent pipe sections.

A coupling feature for coupling the outer wall 200B of pipe 200 with the outer wall 210B of pipe 210 using a "bayonet" or twist-type mount on the outer walls is illustrated in FIG. 2. As will be generally understood, a bayonet mount is a coupling mechanism designed to quickly couple together two corresponding ends of a connection, and is typically realized by providing a "male" end on one section that mates with a corresponding "female" end on another section. The respective ends are engaged and then twisted with respect to each other, for example, by a quarter turn or less, to quickly couple and lock the two sections together. It should also be understood that the bayonet coupling described is but one of many types of known mechanical coupling features that would be adequate to couple the outer walls of pipe sections together.

The outer walls 200B, 210B of each pipe section 200, 210 are fabricated to include both a male end 202 and a female end 204, as shown in FIG. 1. However, in FIG. 2, only the male end 202 of pipe 200 and the female end 204 of pipe 210 are illustrated to facilitate a description of how to couple the two pipe sections together. It should be recognized that both pipes are typically identical, and that additional pipe sections could be coupled as necessary to the female end 204 of pipe 200 and/or the male end 202 of pipe 210 using the features described.

The female end 204 of pipe section 210 is fabricated to include a plurality of locking lugs 220 disposed about the circumference of the pipe section. The locking lugs 220 are formed in an oblong shape and are recessed from the surface of outer wall 210B. Each locking lug 220 includes a locking notch 222, a first curved edge 224, and a second curved edge 226. The locking notch 222 is located in the center of the recessed portion of locking lug 220 and isolates first and second regions 230 and 232, respectively, which are more deeply recessed than the locking lug. In one embodiment, four locking lugs 220 are disposed about the circumference of the pipe section, but more or fewer may be used.

The male end 202 of pipe section 200 is fabricated to include a plurality of locking channels 240, 250 disposed about the circumference of pipe section 200. In one embodiment, four locking channels are spaced apart by approximately 90° around the circumference of pipe section 200, and locking channels 240 and 250 may have slightly different structures. The locking channels 240, 250 are designed to mate with the locking lugs 220 such that when the male end 202 of pipe section 200 (including channels 240, 250) engages the female end 204 of pipe section 210, each lug 220 slides into the corresponding locking channel as the sections are brought together until the movement of the pipe sections toward each other is prevented by the shape of the channel. Subsequently, the pipe sections 200 and 210 are rotated clockwise with respect to each other until full engagement of the interlocking mechanism is complete.

FIG. 2 shows the locking lugs 220 of pipe section 210 positioned over entrances to the locking channels 240, 250 on pipe section 200. Pipe section 210 is positioned such that the bottom edge 203 of pipe section 210 is adjacent to the top edge 205 of pipe section 200, and locking lugs 220 are aligned with locking channels 240 and 250, respectively. It will be understood that two additional locking lugs are aligned with two other locking channels, but this detail is not shown here. The pipe sections 200, 210 are then brought together so that the locking lugs 220 enter the locking channels 240, 250 and are guided therein by the relatively trapezoidal shape of an entrance region of the locking channels 240 and 250. The pipe sections 200, 210 are then rotated relative to each other so that the locking notch 222 of locking lug 220 on pipe section 210 engages a locking tab 260 in rotational channel 262 on pipe section 200, and edge 224 of locking lugs 220 on pipe section 210 engages ends 242 of respective channels 240, 250 on pipe section 200.

Figure 3:
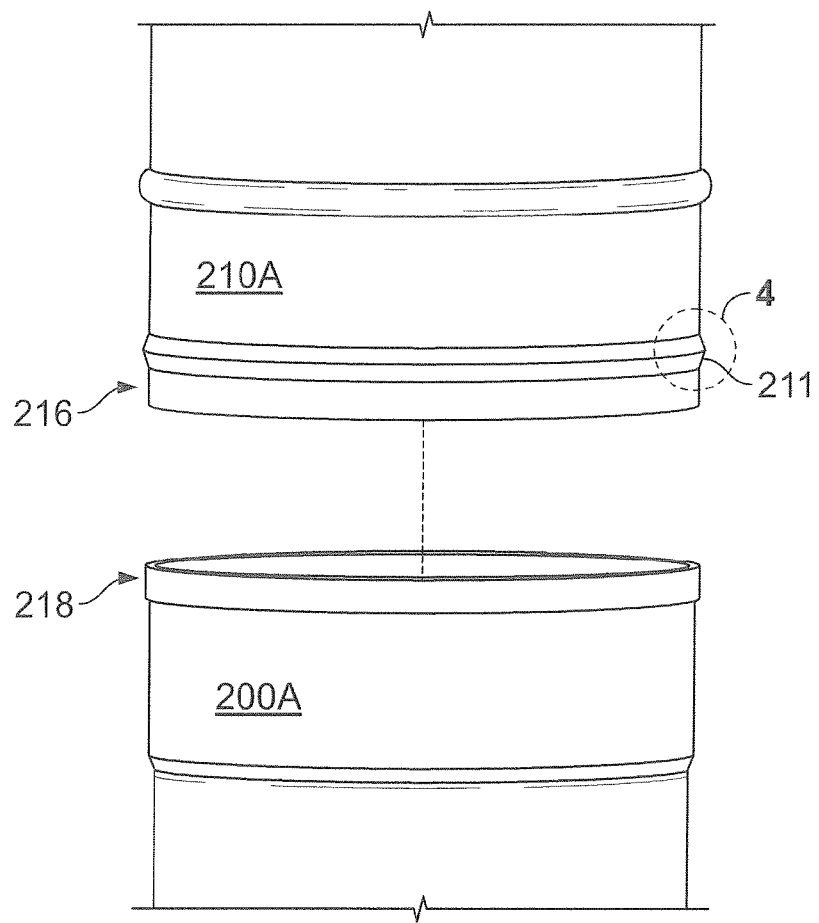
FIG. 3 is a side plan view illustrating a coupling of the inner walls of the double-walled vent pipe sections shown in FIG. 2.
Figure 4:
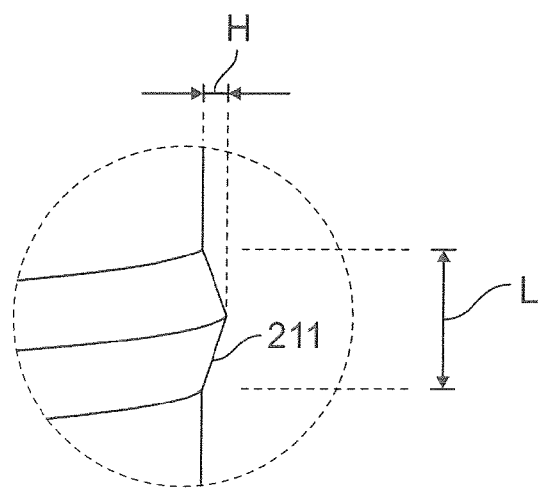
FIG. 4 is a detailed side plan view of a portion of FIG. 3.

A unique feature of pipe sections 200, 210, illustrated in FIGS. 3-4, is that a ridge 211 is formed on the inner walls 200A, 210A, allowing for gasket-less joining of the respective ends of the pipe sections. In combination with the use of a laser-welded seam for pipe sections 200, 210, the gasket-less coupling meets code standards specified for pellet stove chimneys.

As shown in FIGS. 3-4, the outer walls of pipe sections 200, 210 including bayonet coupling features have been peeled away to reveal inner pipes 200A, 210A, and ridge 211 formed on inner pipe 210A. Thus, the end of inner pipe 210A having the ridge 211 is considered the male end 216, and is located inside the female end 204 of outer wall 210B. The male end 216 of inner pipe 210A mates with the female end 218 of inner pipe 200A, which is located inside the male end 202 of outer wall 200B.

The ridge 211 extends from the surface of inner pipe 210A into the annular region 210C. In one embodiment, the ridge 211 has a height H of approximately 1/64 inches extending from the surface of inner pipe 210A and a length L of approximately 3/8 inches to ensure a press-fit seal with the female end 218 of the inner pipe. It will be understood that such dimensions may vary. The ridge 211 is formed by rolling a bead into the surface of inner wall 210A when the pipe 210 is formed. Further, the inner pipe 210A has a seam (not shown) when the cylindrical pipe section is formed by rolling, and the seam may be laser-welded, resulting in a high tolerance seam with no folded edge. Under testing, the ridge 211 in conjunction with the laser-welded seam has allowed the pipe to meet the Underwriters Laboratories Canada standard ULC/ORD-C441-M1990 for Pellet Vents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A double-walled vent pipe section, comprising:
   a first cylindrical structure having:
      a first outer wall,
      a first inner wall coaxially disposed within the first outer wall having an outer cylindrical surface defined by a diameter extending along the first inner wall a first length from an end of the first inner wall toward an opposing end of the first inner wall, and
      said first outer wall having a first coupling feature on a first end of the first cylindrical structure and a second coupling feature on a second end of the first cylindrical structure,
   a second cylindrical structure having:
      a second outer wall,
      a second inner wall coaxially disposed within the second outer wall, the second inner wall having an inner cylindrical surface having a diameter extending a second length from an end of the second inner wall toward an opposing end of the second inner wall, the diameter of the inner cylindrical surface allowing the first inner wall to be inserted into the second inner wall so that at least the first and second lengths substantially overlap, and
      a first annular region separating the first outer wall from the first inner wall, and a second annular region separating the second outer wall from the second inner wall;
   said second outer wall having a first coupling feature on a first end of the second cylindrical structure and a second coupling feature on a second end of the second cylindrical structure;
   said first coupling feature of the first cylindrical structure adapted to mate with the second coupling feature on the second end of the second cylindrical structure, and said first inner wall having an annular ridge formed therein at a spaced distance apart from said end of the first inner wall, the annular ridge having a height above the outer cylindrical surface and extending into the first annular region, wherein the first end of the first cylindrical structure including the annular ridge is inserted into the second cylindrical structure so that the outer cylindrical surface mates with the inner cylindrical surface along the first and second lengths and the annular ridge engages with the inner cylindrical surface at a spaced distance apart from the end of the second inner wall within the second length.

2. The double-walled vent pipe section of claim 1, wherein the annular ridge is disposed around a circumference of the first inner wall.

3. The double-walled vent pipe section of claim 1, wherein the height is defined by a first surface and a second surface meeting at an apex, and the first and second surfaces define a length.

4. The double-walled vent pipe section of claim 3, wherein the height is approximately one-sixty-fourth of an inch.

5. The double-walled vent pipe section of claim 3, wherein the length is approximately three-eighths of an inch.

6. The double-walled vent pipe section of claim 1 wherein the height of the annular ridge defines a diameter greater than the diameter of the outer cylindrical surface to create a seal between the first inner wall on the first end of the first cylindrical structure and the second inner wall on the second end of the second cylindrical structure when the first and second cylindrical structures are mated together.

7. A system for coupling vent pipe sections, comprising:
   a first cylindrical structure having an outer wall, an inner wall coaxially disposed within the outer wall, and an annular region separating the outer wall from the inner wall, said outer wall having a first coupling feature on a first end of the first cylindrical structure and a second coupling feature on a second end of the first cylindrical structure, and said inner wall having a first end having an outer cylindrical surface defined by a diameter along a length extending from the first end of the inner wall, the outer cylindrical surface having an annular ridge formed therein at a distance spaced apart from said first end within the length, the annular ridge extending into the annular region near the first end of the first cylindrical structure; and
   a second cylindrical structure having an outer wall, an inner wall coaxially disposed within the outer wall, and an annular region separating the outer wall from the inner wall, said outer wall having a first coupling feature on a first end of the second cylindrical structure and a second coupling feature on a second end of the second cylindrical structure, said inner wall of said second cylindrical structure having an inner cylindrical surface defined by a diameter greater than the diameter of the outer cylindrical surface along a length extending away from an edge of the inner wall, the inner wall receiving the first end of the inner wall of the first cylindrical structure along the length;
   wherein the second end of the second cylindrical structure mates with the first end of the first cylindrical structure such that the first coupling feature of the first cylindrical structure engages with the second coupling feature of the second cylindrical structure, and the first end of the first cylindrical structure including the annular ridge on the outer cylindrical surface of the inner wall of the first cylindrical structure is inserted into the second cylindrical structure so that the annular ridge engages with the inner cylindrical surface of the inner wall of the second cylindrical structure past the edge and within the length of the inner cylindrical surface to create a seal between the inner wall on the first cylindrical structure and the inner wall on the second cylindrical structure.

8. The system of claim 7, wherein the annular ridge has a height defined by a first surface and a second surface meeting at an apex, and the first and second surfaces define a length.

9. A double-walled vent pipe section, comprising:
   a first cylindrical structure having:
      an outer wall,
      a first inner wall coaxially disposed within the outer wall, the first inner wall having a first end defined by an edge, the first inner wall including an outer cylindrical surface defined by a first diameter extending a first length from the first end of the inner wall, and
      an annular region separating the outer wall from the first inner wall,
      said first inner wall having an annular ridge formed therein in the first length and apart from the edge of the first inner wall, the annular ridge extending into the annular region, wherein the first end of the inner wall of the first cylindrical structure including the annular ridge is inserted into a corresponding second cylindrical structure so that the annular ridge engages with a second inner wall of the second cylindrical structure, the second inner wall of the second cylindrical structure having an inner cylindrical surface having a second diameter extending a second length from an end of a second inner wall toward an opposing end of the second inner wall, the second diameter of the inner cylindrical surface greater than the first diameter to allow the first inner wall to be inserted into the second inner wall so that at least the first and second lengths substantially overlap, and wherein the annular ridge has a diameter greater than the first diameter to engage the inner cylindrical surface at a position within the second length spaced apart from the end of the second inner wall to create a seal between the first inner wall of the first cylindrical structure and the second inner wall of the second cylindrical structure when the first and second cylindrical structures are mated together.

10. A system for coupling double-walled vent pipe sections, comprising:

a first cylindrical structure including a first inner wall having an outer cylindrical surface defined by a diameter extending along the first inner wall a first length from an end of the first inner wall toward an opposing end of the first inner wall, the outer cylindrical surface having an annular ridge formed therein extending from the outer cylindrical surface and formed near a first end thereof within the first length spaced apart from the end of the first inner wall; and a second cylindrical structure including a second inner wall, the second cylindrical structure including a first end and a second end, the second inner wall having an inner cylindrical surface having a diameter extending a second length from an end of the second inner wall toward an opposing end of the second inner wall, the diameter of the inner cylindrical surface being greater than the diameter of the outer cylindrical surface to allow the first inner wall to be inserted into the second inner wall so that at least the first and second lengths substantially overlap;

wherein the second end of the second cylindrical structure mates with the first end of the first cylindrical structure, such that the first end of the first cylindrical structure including the annular ridge on the first inner wall of the first cylindrical structure is inserted into the second cylindrical structure so that the annular ridge engages with the inner cylindrical surface, the second length of the inner cylindrical surface and the first length of the outer cylindrical surface substantially overlapping, the annular ridge engaging the inner cylindrical surface within the second length of the inner cylindrical surface spaced apart from the end of the second inner wall at the second end of the second cylindrical structure to provide a seal between the first and second inner walls on the first and second cylindrical structures.

* * * * *